Dec. 25, 1951

S. C. SKEELS 2,579,765

VISIBLE INDEX

Filed July 5, 1946

Inventor
Simon C. Skeels

By [signature]
Attorney

Patented Dec. 25, 1951

2,579,765

UNITED STATES PATENT OFFICE 2,579,765

VISIBLE INDEX

Simon C. Skeels, Scarsdale, N. Y., assignor to Remington Rand Inc., Buffalo, N. Y., a corporation of Delaware Application July 5, 1946, Serial No. 681,470

4 Claims. (Cl. 129—16.7)

This invention relates to card indexes and particularly to a visible index.

The present invention provides a visible index that is particularly adapted for use in indexing and handling reservations for passenger transportation and similar seating space in an efficient and economical manner.

The invention provides a plurality of offset overlapping index strips having folded portions arranged in interengaged relation for mounting on a card holder along the visible margin thereof in visible indexed relation to provide a plurality of pockets for independently receiving index inserts between adjacent index strips for independent insertion and removal in the card holder in visible indexed relation. The invention comprehends the provision of means for holding the index strips in substantially constant offset relation, while at the same time, eliminating unnecessary build-up in the number of superimposed sheets on the card holder.

The invention provides a plurality of indexed pockets along the margin of a card holder in visible indexed relation for independently receiving one or more index inserts between each adjacent index strip for positioning over the visible margin of an adjacent index strip in visible indexed relation to provide a means for indexing passenger space and reservations, in a convenient and efficient manner, in transportation and similar types of indexes.

The invention provides means for conveniently securing a plurality of interengaged overlapped index strips in detachable visible indexed relation on a card holder for cooperation to provide a plurality of individual pockets for receiving in separated relation, one or more index inserts in visible indexed relation.

The present invention provides a visible index in which seating space for reservation, telegrams, cards and memoranda pertaining thereto and tickets for transportation and similar type records such as train consists, switching lists and card records will be adapted to receive inserts in the form of tickets or reservation slips, cards, memoranda, telegrams or other media, in individual pockets, so that any inserts may be inserted or removed in the visible index for cooperation to indicate a seating space reservation, sale or location and at the same time show, at a glance, the unsold seating space or the like and its character or location.

Figures 1, 2, 3, 4, 5, 6, 7:
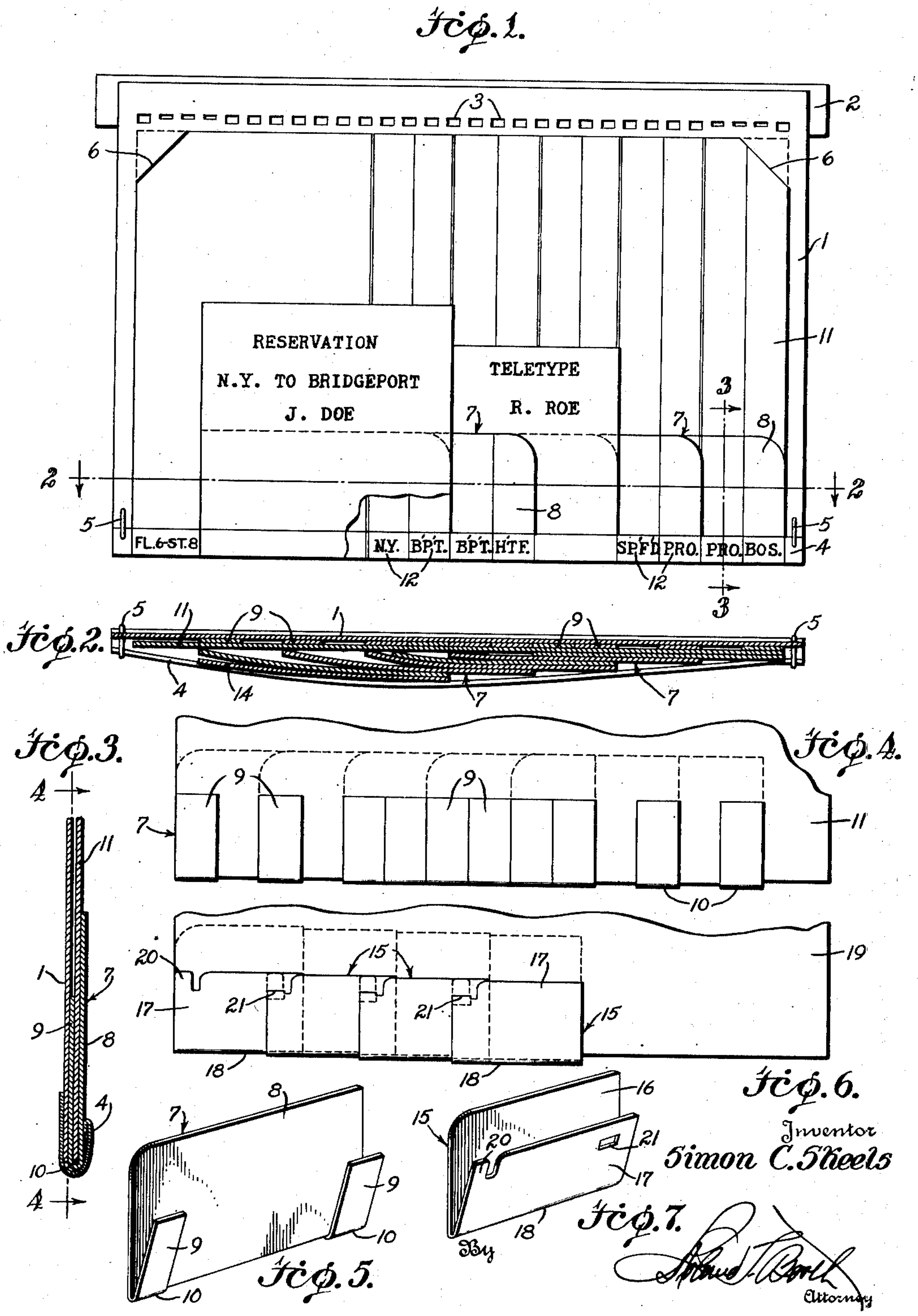
Fig. 1 shows a visible index card holder in plan view having a transparent sheath on the free marginal portion thereof with index strips detachably engaged thereon in visible indexed relation to illustrate the construction and operation of the invention.
Fig. 2 is a cross-section taken on line 2—2 of Fig. 1.
Fig. 3 is a cross-section taken on line 3—3 of Fig. 1.
Fig. 4 is a view looking at the rear of the interengaged index strips shown in Fig. 1 with the upper portion of the retaining card broken away, taken on line 4—4 of Fig. 3.
Fig. 5 shows one of the index strips illustrated in Figs. 1 to 4 in perspective, looking at the rear side.
Fig. 6 is a view similar to Fig. 4 showing a modified form of index strip having the rear portion formed with a tongue at one corner and a slot at the opposite corner to receive the tongue on an adjacent index strip in interengaged relation for retaining the index strips in fixed offset relation.
Fig. 7 shows one of the cards illustrated in Fig. 6 in perspective, looking at the rear thereof.

The drawing illustrates a conventional type of card holder having a sheet 1 with one margin secured to a supporting lug 2 and provided with a line of perforations 3 forming a hinge. The free margin of sheet 1 has a transparent sheath 4 of folded construction engaged about the free margin and secured thereto by wire stitches, or the like, 5. This provides a structure for the reception of cards along the free margin of sheet 1 of the card holder under sheath 4 for detachable retention on the card holder with the portions engaged in sheath 4 arranged in visible indexed relation. Sheet 1 is formed with diagonal corner slots 6 in opposite side portions adjacent the hinge apertures 3. This construction is of conventional form, well-known in the art, in visible card indexes.

A plurality of index strips 7 have front portions 8 and back portions 9 formed in folded relation with the fold portion 10 along one margin of front portion 8 defining the junction between the front and back portion of each index strip. While each index strip 7 may be in the form of a rectangular strip folded intermediate its ends, the strip 7 shown in Fig. 5 has the back portion formed by a pair of narrow sections having a width determined by the amount of the offset desired in arranging several index strips with the front portions in visible overlapping offset relation.

Index strips 7 are assembled so that fold portions 10 are in aligned relation and back portions 9 on one index strip 7 are interengaged in edge-to-edge relation with the back portions 9 on other strips 7, as shown in Fig. 4. In this way, the back portions 9 present only one thickness of sheet material to provide what is known as "build-up" in the index and thereby avoids additional thicknesses of overlapping sheets. Front portions 8 are arranged in offset overlapping relation, as shown in Figs. 1 and 2, with back portions 9 determining the amount of offset of each front portion 8 in the assembled relation of a series of index strips.

A retaining card 11 has one marginal portion engaged between front and back portions 8 and 9 of index strip 7 in fold portions 10 thereof for retaining the portions of index strips 7 adjacent fold portions 10 engaged in sheath 4 of the card holder in visible indexed relation. The opposite marginal portion of retainer card 11 has the corners thereof engaged in diagonal slots 6 of the card holder for detachably retaining index strips 7 interengaged in offset overlapping visible index relation on card holder 10 with the fold portions engaged in sheath 4, as shown in Fig. 1.

The visible marginal portion of each front portion 8 of each index strip 7 is provided with index indicia, as shown in Fig. 1 at 12. This index indicia 12 may be of any suitable character for use in the system to be employed with index strips 7.

When index strips 7 are mounted in offset overlapping relation, across the free margin of a card holder, as shown in Fig. 1 in visible indexed relation, the overlapping front portions 8 will provide a plurality of independent pockets in front of card 11 corresponding in number to the number of index strips 7. These pockets are adapted to receive independent index inserts 14 between the adjacent front portions of two adjacent index strips 7. Index inserts 14 are inserted in the card holder to engage in sheath 4 between adjacent front portions 8 of two adjacent strips 7 with a portion overlapping the visible portion of the index strip in the rear thereof to cover the index on the margin of the adjacent index strip in the rear. The index insert 14 will act as an indexing element in front of the adjacent front portion 8 which it covers. The index insert may be provided with suitable index indicia on the portion arranged in visible relation over the covered visible margin of the front portion of index strip 7.

Index inserts 14 may be in the form of an index card, a telegram, teletype, sales slip or ticket of any suitable size and shape. When an insert 14 is of fairly large size, it may be folded a suitable number of times to adapt it for engagement between two front portions 8 in card holder 1 under sheath 4 to perform its indexing function in the manner illustrated in Fig. 1.

The present visible index construction is particularly adapted for use in handling seating space and reservations therefor, in connection with transportation records such as air lines, railroads, and buses. In providing a record for space control on an air line, or the like, it will be understood that a number of card holders equal in number to the number of seats available on a particular vehicle, are mounted in offset overlapping visible indexed relation, in a manner well-known in the art, so that an index insert or card, may be inserted in the left-hand end of the sheath 4, as shown in Fig. 1, for indexing each card holder and the information contained therein.

Then, a series of index strips 7 are mounted in each card holder corresponding in number to the number of stops the vehicle will make on its route between two given points. Each index strip 7 has two sets of index indicia provided on the visible margin thereof, as indicated at 12, so that a pocket is provided on each card holder for travel space for each passenger accommodation between each station or stop made by the vehicle on its trip.

For example, Fig. 1 shows five index strips inserted in offset overlapping indexed relation along the visible margin of one card holder. This provides for the reservation of a space for passenger accommodation making five stops en route to its destination. The first, or left-hand index strip 7, is provided on the visible margin with the indicia "N. Y.—B'P'T." which will designate travel from New York to Bridgeport. The next strip to the right, is provided with the designation "B'P'T.—H'TF." providing for travel from Bridgeport to Hartford, the second stop made en route. The remaining index strips 7 are correspondingly indexed for each subsequent stop on the route.

With this set-up of the index, passenger space may be sold between any two stops on the route. For this purpose an index insert 14 is engaged between two adjacent front portions 8 of index strips 7 so as to overlie the indicia 12 designating the two stops between which the space is reserved or sold. This immediately shows in the visible index the particular space sold and portion of the trip covered by the sold space. If any portion of the trip has the particular seating space left unsold, then the indicia on the index strip 7 will be visible to show the unsold and unreserved seating space, at a glance. Obviously, when a plurality of card holders similar to that shown in Fig. 1, corresponding in number to the number of seating or other spaces to be sold on a vehicle for a given trip are arranged in visible indexed relation, it will be clear how it will be possible to observe at a glance, in a convenient and efficient manner, which seating spaces remain unsold in order that information may be obtained for the sale of the remaining seating space.

Fig. 7 illustrates a construction of index strips 15 having a front portion 16 and a back portion 17 joined together at the fold 18. A plurality of index strips 15 are arranged in overlapped offset relation in the same manner as index strips 7, so as to have the front and rear fold portions engage on opposite sides of a retaining card 19, as shown in Fig. 6. In order to retain index strips 15 fixed in offset overlapping relation, the rear portion 17 of each has a tongue 20 formed by a cut-out portion on the end of rear portion 17, as shown in Fig. 7. Tongue 20 is adapted to interengage in an opening 21 formed in the rear portion 17 of an adjacent card in the corner portion opposite to that formed with tongue 20. The interengagement of tongue 20 in aperture 21 of an adjacent card is shown in the rear elevation in Fig. 6 illustrating how the offset overlapping index strips 15 are interlocked in assembled relation to prevent one index strip from slipping with respect to an adjacent strip and thereby change the overlapping relationship therebetween.

The manner of indexing, mounting and operating the structure shown in Figs. 6 and 7 is identical with that above described in connection with the structure shown in Figs. 1 to 5.

When it is desired to make up indexes for space reservation using the construction described above, it will be understood that the desired number of index strips 7 corresponding to the number of stops to be made on a route by a vehicle are selected for mounting in offset overlapping relation in a card holder in which they are detachably retained by card 11 against accidental displacement or disengagement from the card holder. Yet, index inserts may be individually inserted and removed between adjacent front portions 8 of the index strips without interfering with the inserts in other pockets between strips 7 and without interfering with the assembled relation and indexed order of the index strips.

The invention claimed is:

1. A card index comprising a card holder having a transparent sheath embracing a margin thereof, a plurality of index strips transversely folded intermediate their ends to form a substantially V-shaped member having front and rear portions and having the said front and rear portions interengaged in offset overlapping relation one in another, said interengaged front and rear portions being engaged in said sheath with the folded portion at the bottom of the sheath in visible indexed relation along the margin of said card holder, and means engaged between said front and rear portions for detachably retaining said interengaged index strips in said sheath for cooperation to provide a plurality of separated visibly indexed pockets extending into said sheath on the margin of said card holder for independently receiving index inserts between adjacent index strips for display through said sheath.

2. A card index, comprising a plurality of index strips, each formed with a front portion and a pair of back portions spaced apart and extending in folded relation from one edge of the front portion over the back of said front portion, said strips being arranged in overlapping offset interengaged relation with aligned fold portions, said back portions being interengaged in edge-to-edge relation for holding the front portions in fixed offset relation, and means for detachably holding the assembled index strips on the margin of a card holder in visible indexed relation for detachably and independently receiving index inserts between adjacent front portions along said fold portions.

3. A card index, comprising a plurality of index strips, each formed with a front portion and a back portion extending in folded relation from a margin of the front portion, said strips being mounted with said front portions in offset overlapping relation with aligned fold portions, said back portions each having a width equal to the offset margin of the front portions and interengaging in coplanar edge-to-edge relation to maintain the offset relation of the front portions, and means for mounting said index strips in visible indexed relation on a card holder for independently and removably receiving index inserts engaged in the fold portion between adjacent front portions in visible indexed relation.

4. A card index, comprising a plurality of index strips, each formed with a front portion and a back portion extending in folded relation from a margin of the front portion, said strips being mounted with said front portions in offset overlapping relation with aligned fold portions, said back portions each having a width equal to the offset margin of the front portions and interengaging in edge-to-edge relation to maintain the offset relation of the front portions, a card holder, a transparent sheath on a margin of said card holder detachably receiving the aligned fold portions of said index strips therein in visible indexed relation, and a card having one margin engaged in said aligned fold portions and an opposite margin detachably engaged with portions of said card holder for retaining said index strips assembled in said sheath for independently receiving index inserts between adjacent overlapped front portions in visible indexed relation.

SIMON C. SKEELS.

REFERENCES CITED

The following references are of record in the file of this patent:

UNITED STATES PATENTS

| Number | Name | Date |
|---|---|---|
| 1,733,304 | Hutchings | Oct. 29, 1929 |
| 1,755,517 | Reynolds | Apr. 22, 1930 |
| 2,232,193 | Wassell | Feb. 18, 1941 |

FOREIGN PATENTS

| Number | Country | Date |
|---|---|---|
| 731,966 | France | June 6, 1931 |